UNITED STATES PATENT OFFICE.

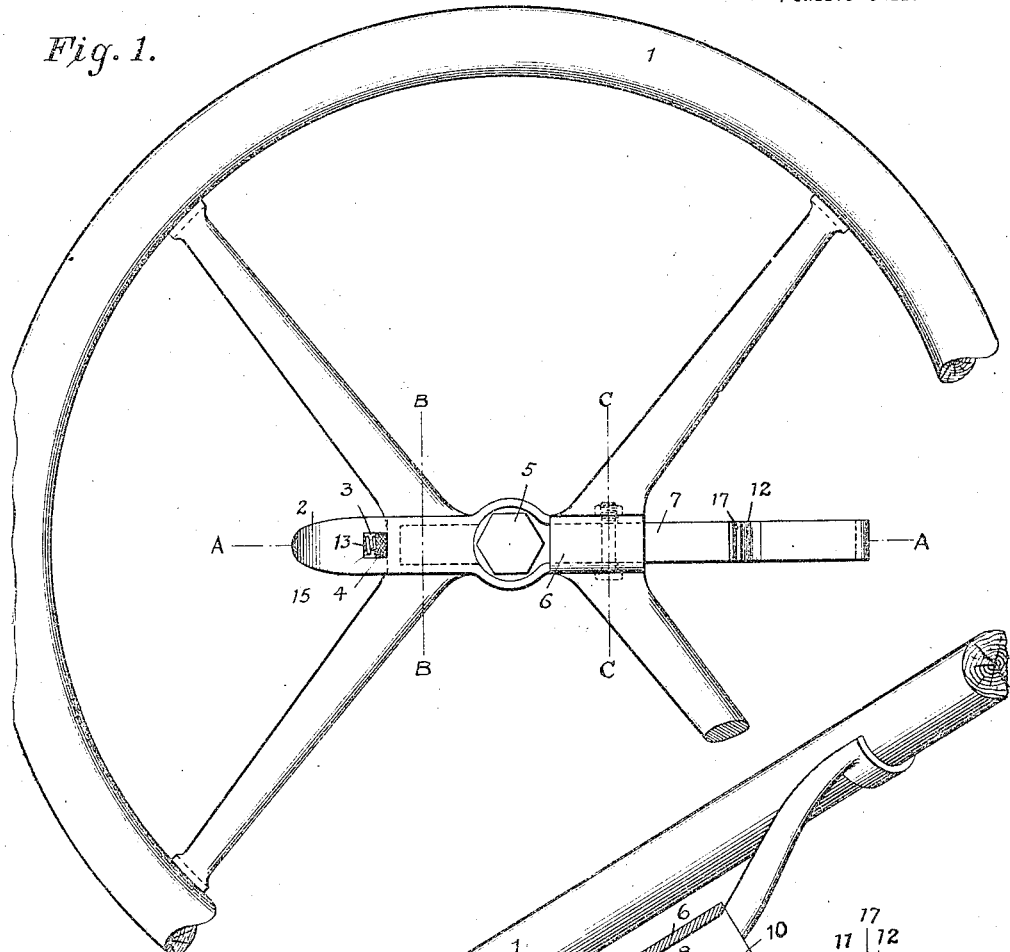
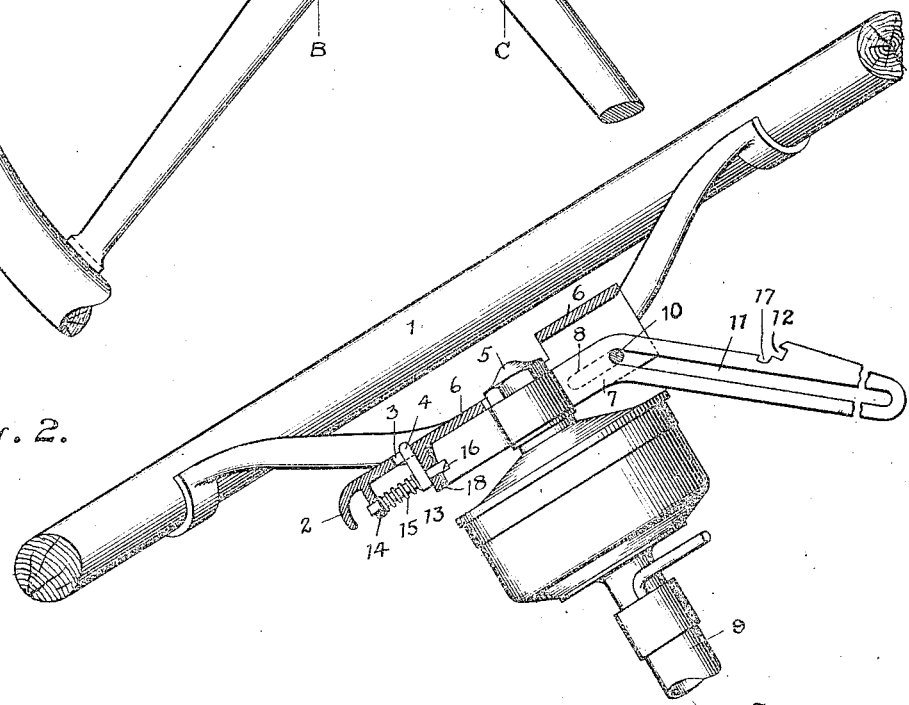

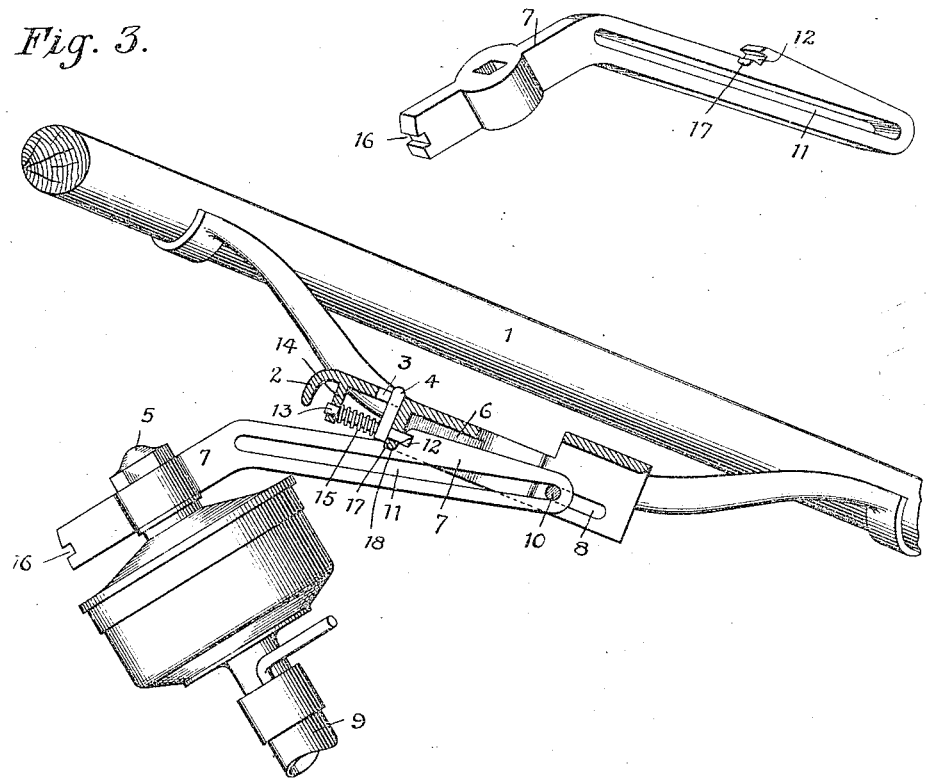
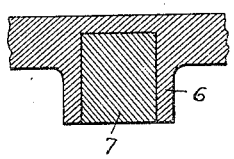
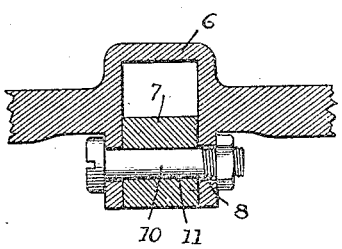

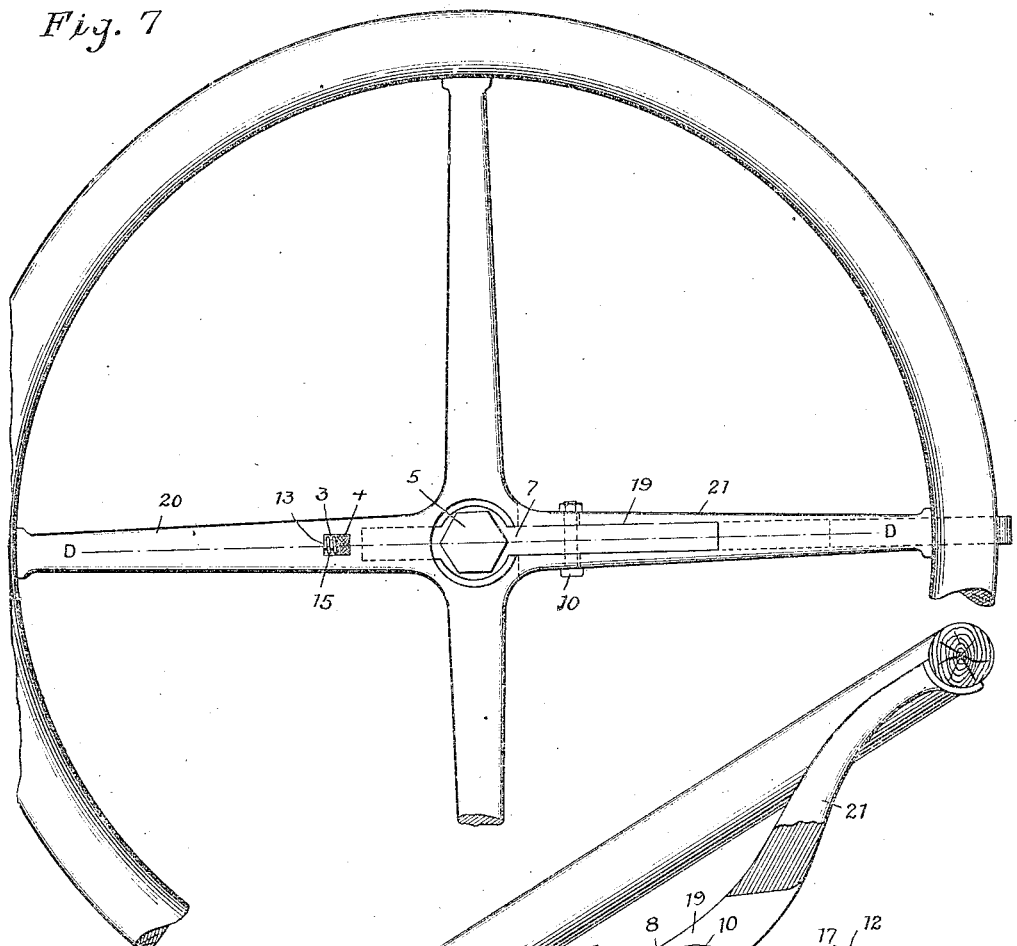
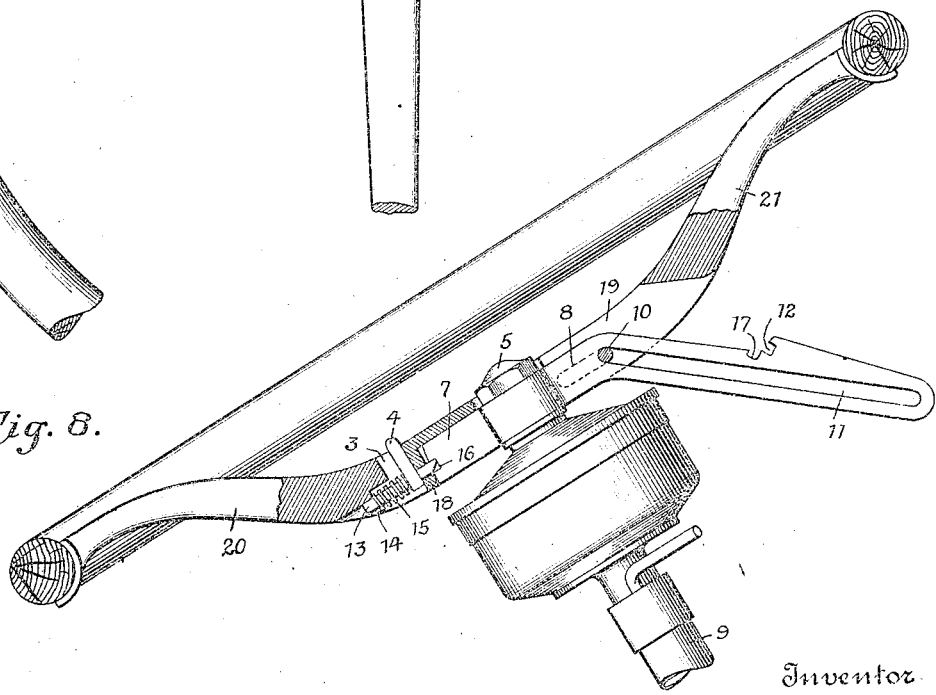

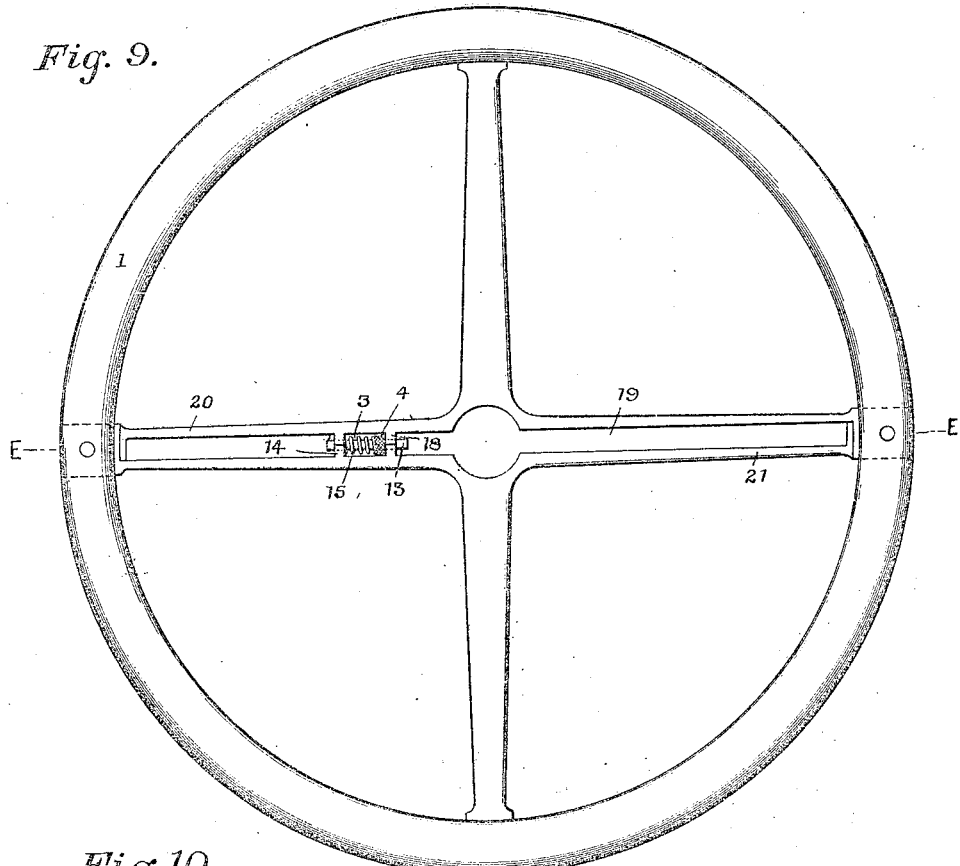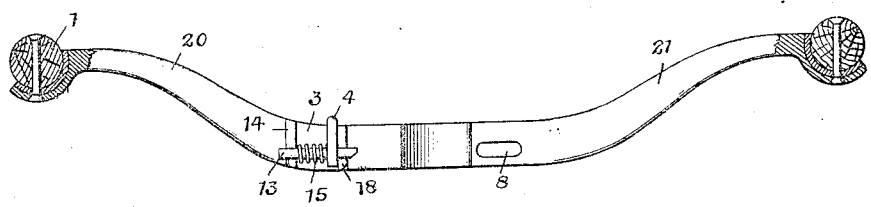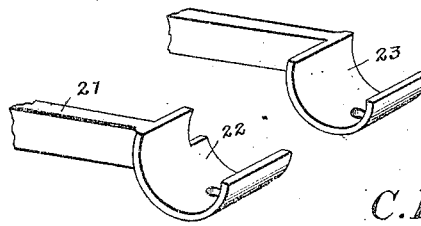

CLAUD M. DOUGLASS, OF RICHFIELD SPRINGS, NEW YORK.

STEERING-WHEEL.

1,237,489.

Specification of Letters Patent.

Patented Aug. 21, 1917.

Application filed February 25, 1915. Serial No. 10,652.

*To all whom it may concern:*

Be it known that I, CLAUD M. DOUGLASS, a citizen of the United States, residing at Richfield Springs, in the State of New York, have invented new and useful Improvements in Steering-Wheels, of which the following is a specification.

My invention relates to improvements in steering wheels and especially to those for motor vehicles and the like, and the objects of my invention are; first, to provide means for attaching the wheel to the steering shaft whereby it may be shifted from its normal position on the steering shaft; second, to provide means for locking the wheel in the normal as well as in a shifted position; and third, to gain more positive steering qualities from the wheel in the shifted than in the normal position.

I attain these objects by the mechanism illustrated in the accompanying drawings in which:

Figure 1 is a plan view of the mechanism applied to a steering wheel in the normal position; Fig. 2 is a sectional view of the invention on the line A A of Fig. 1; Fig. 3 is a plan view of the mechanism applied to a steering wheel locked out of its normal and in a shifted position; Fig. 4 is a section of Fig. 1 on the line B B; Fig. 5 is a section of Fig. 1 on the line C C; Fig. 6 is a perspective view of the bent slotted steering shaft head; Fig. 7 is a plan view of a steering wheel with the mechanism forming part of the spokes or spider of the wheel; Fig. 8 is a vertical section of Fig. 7 on the line D D; Fig. 9 is a view of the mechanism in a steering wheel, the spider of which is in two pieces; Fig. 10 is a view of the vertical face of one part of the spider along the line (E E) of division; and Fig. 11 shows the overlapping ends of the spokes of Fig. 9.

The same numbers refer to the same parts throughout the several views.

As shown in the drawings, 9 represents the upper end of a steering post in which is inclosed the steering and controlling elements. On the end of the steering shaft is secured a head 7 which is held in position thereon in like manner as the regular steering wheel by nut 5. Said head extends on opposite sides of the steering shaft; the longer extension or arm of which is horizontally slotted throughout most of its length as shown at 11, is extended from the steering shaft at a smaller angle than the other arm or, in other words, is bent toward the steering shaft, and its upper or outer surface is raised and recessed at 12 and 17 to receive locking bolts 13 and lug or projection 18; the other extension or arm is recessed at 16 in its front face or end to receive locking bolt 13. Wheel 1 is adjustably secured to this head 7 by passing bolt 10 through a cap 6 formed in the spider or spokes of wheel 1 to fit snugly over the head and through the slot 11.

This cap is provided with a spring lock 13 in one end and in the other end at the sides are corresponding slots or holes 8. The spring lock is inside the cap space and the lock bolt is supported by two walls or plates 14 and 18 through which it passes. 18 is extended below the cap, forming a stationary locking lug which automatically engages recess 17 in the head. A finger lug 4 is secured to the lock bolt 13 and is extended upward and through the top of the cap in which there is a slot 3 to guide the movement of the lug. The finger lug on said bolt butting said plate 18 prevents the bolt from protruding more than is desirable or operative. A spring 15 is so arranged on lock bolt 13 as to cause the bolt to be in position at all times to engage the recesses therefor on the head as shown at 12 and 16.

I do not desire however to be limited to the construction above described and shown in Figs. 1 to 6 inclusive, because instead of a cap integral with the spokes of the steering wheel the same results will be attained by cutting or casting a channel or groove 19 in the underside of opposite spokes 20 and 21 of the spider of the steering wheel as shown in Figs. 7 and 8. The same results are attainable also by using a spider split into two parts as shown in Figs. 9, 10 and 11.

When the wheel is placed in its normal position the cap 6 fits snugly over the head 7, the spring lock bolt 13 engages the front recess 16 of the head 7 and the center of the corresponding slots or holes 8 in opposite sides of the cap fall on the center line of the long slot 11 in the head. Bolt 10, passing through the slots 8 and 11 allows the wheel to be moved along the head in the direction of the slot 11, when the spring lock is released, but otherwise secures the wheel to said head. The steering wheel is therefore locked in this, the normal position, Fig. 2, and the proper operation of the steering mechanism is possible in the same degree as when an ordinary steering wheel is used.

The wheel is adapted to move along the head 7 bearing on bolt 10 sliding in slot 11. When the wheel is moved along said head until bolt 10 rests at the lowest point in the slot, the spring lock engages the groove or recess 12 in the top of the head, and the end of plate 18 engages the recess 17. The lock bolt holds the wheel from any forward, outward or downward movement while the lower portion of the plate 18 prevents any upward or backward movement of the wheel. In this shifted position then, Fig. 3, the wheel is likewise locked and as the head increases the leverage of the wheel on the steering shaft, the steering mechanism may be operated with greater ease and precision than when the wheel is in its normal position.

The operation of my invention when applied to an automobile is as follows: The driver releases the lock 13 by moving the finger lug 4 of the spring lock outward from the steering post, raises the wheel and slides it along the head until the spring lock and plate, 13 and 18, engage the recesses 12 and 17, respectively, on the top of the head 7. The wheel will then be clear of the driver's seat and he can move into or out of it more freely than with a fixed wheel. The wheel when locked in its shifted position lies in a plane more or less parallel with the steering post, and the driver may guide his car with greater precision and ease by moving the wheel around the steering post.

Having described my invention what I claim as new and desire to secure by Letters Patent is:

1. In a steering mechanism, a head longitudinally slotted through its vertical sides and having recesses to receive a lock bolt and a steering member to which said head is secured.

2. In a steering mechanism, a head having an angular vertical section, slotted through its vertical sides and having recesses to receive a lock bolt and a steering member to which said head is secured.

3. In a steering mechanism, the combination of a steering wheel with a lock bolt therein, a steering shaft and a steering shaft head with which the steering wheel has a sliding engagement and which has an angular vertical section and is longitudinally slotted through its vertical sides and recessed at various places to receive the said lock bolt.

4. In a steering mechanism, the combination of a steering member, a head having an angular vertical section and being longitudinally slotted through its vertical sides on the end thereof, a steering wheel having a sliding engagement with said head and means for locking the wheel in different positions on the head.

5. In a steering mechanism, a steering member, a head with an angular vertical section, longitudinally slotted through its vertical sides secured thereto, a steering wheel having a sliding engagement therewith and means for locking the wheel in different positions thereon.

6. In a steering mechanism, the combination with the steering member of a head on the end thereof and a steering wheel having a sliding engagement therewith, the spokes of which are recessed to form a slot which fits over said head and guides the wheel in its movement thereon.

7. In a steering mechanism, the combination with the steering member of a head on the end thereof and a steering wheel the spider of which is slotted throughout opposite spokes which slot fits over said head and guides the wheel in its movement thereon.

8. In a steering mechanism, the combination with the steering shaft of a slotted head on the end thereof, a bolt and a steering wheel having a sliding engagement with said head and adjustably secured thereto by said bolt traveling in the slot therein and locking means to adjust the position of the wheel on said head.

In testimony whereof I affix my signature in presence of two witnesses.

C. M. DOUGLASS.

Witnesses:
C. C. WHEELER,
A. E. EVANS.